(12) United States Patent
De Bree

(10) Patent No.: US 8,616,296 B2
(45) Date of Patent: Dec. 31, 2013

(54) SOIL AERATION DEVICE

(75) Inventor: Cornelis Hermanus Maria De Bree, Zeist (NL)

(73) Assignee: Redexim Handel-en Exploitatie Maatschappij B.V., AC Zeist (NL)

( * ) Notice: Subject to any disclaimer, the term of this patent is extended or adjusted under 35 U.S.C. 154(b) by 270 days.

(21) Appl. No.: 12/936,072

(22) PCT Filed: Mar. 25, 2009

(86) PCT No.: PCT/EP2009/053520
§ 371 (c)(1),
(2), (4) Date: Oct. 1, 2010

(87) PCT Pub. No.: WO2009/121773
PCT Pub. Date: Oct. 8, 2009

(65) Prior Publication Data
US 2011/0042113 A1 Feb. 24, 2011

(30) Foreign Application Priority Data
Apr. 1, 2008 (EP) .................................. 08153919

(51) Int. Cl.
*A01B 45/02* (2006.01)
(52) U.S. Cl.
USPC ............................................ 172/21; 172/125
(58) Field of Classification Search
USPC ................................. 172/21, 22, 94, 95, 125
See application file for complete search history.

(56) References Cited

U.S. PATENT DOCUMENTS

| 4,422,510 | A | * | 12/1983 | de Ridder | 172/21 |
| 5,570,746 | A | * | 11/1996 | Jones et al. | 172/22 |
| 5,709,272 | A | * | 1/1998 | Jones et al. | 172/21 |
| 5,810,092 | A | * | 9/1998 | Selvatici | 172/94 |
| 6,003,613 | A | * | 12/1999 | Reincke | 172/21 |
| 6,199,637 | B1 | * | 3/2001 | Wiedenmann | 172/21 |
| 7,730,960 | B1 | * | 6/2010 | Knight et al. | 172/21 |
| 8,051,917 | B2 | * | 11/2011 | Wiedenmann | 172/21 |
| 2002/0056554 | A1 | * | 5/2002 | Hargreaves et al. | 172/21 |
| 2009/0166048 | A1 | * | 7/2009 | Wiedenmann | 172/21 |

FOREIGN PATENT DOCUMENTS

| DE | 4323315 A1 | 1/1995 |
| DE | 4333310 A1 | 4/1995 |
| EP | 0037595 A1 | 10/1981 |
| NL | 8101743 A | 6/1981 |

OTHER PUBLICATIONS

International Search Report dated Aug. 4, 2009 in corresponding International Patent Application No. PCT/EP2009/053520, 2 pages.

* cited by examiner

*Primary Examiner* — Jamie L McGowan
(74) *Attorney, Agent, or Firm* — Maier & Maier, PLLC

(57) ABSTRACT

A mobile soil aeration device including a machine frame, a drive, at least one guide arm that can be moved up and down by the drive and that is pivotably arranged on the machine frame, at least one articulated piercing tool that is coupled to the guide arm, said piercing tool can be lowered into the soil and withdrawn therefrom, a tool holder for the piercing tool, that is mounted about a first pivotable axis in the guide arm that can be displaced up and down by the drive in order to allow the piercing tool to pivot in relation to the guide arm when engaging with the soil.

9 Claims, 4 Drawing Sheets

Figure 1:
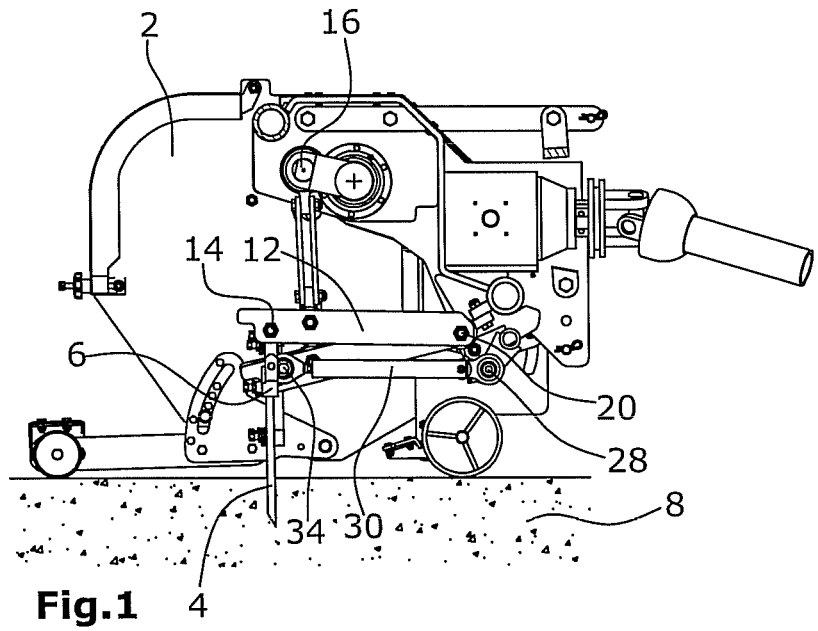

U.S. Patent    Dec. 31, 2013    Sheet 1 of 4    US 8,616,296 B2

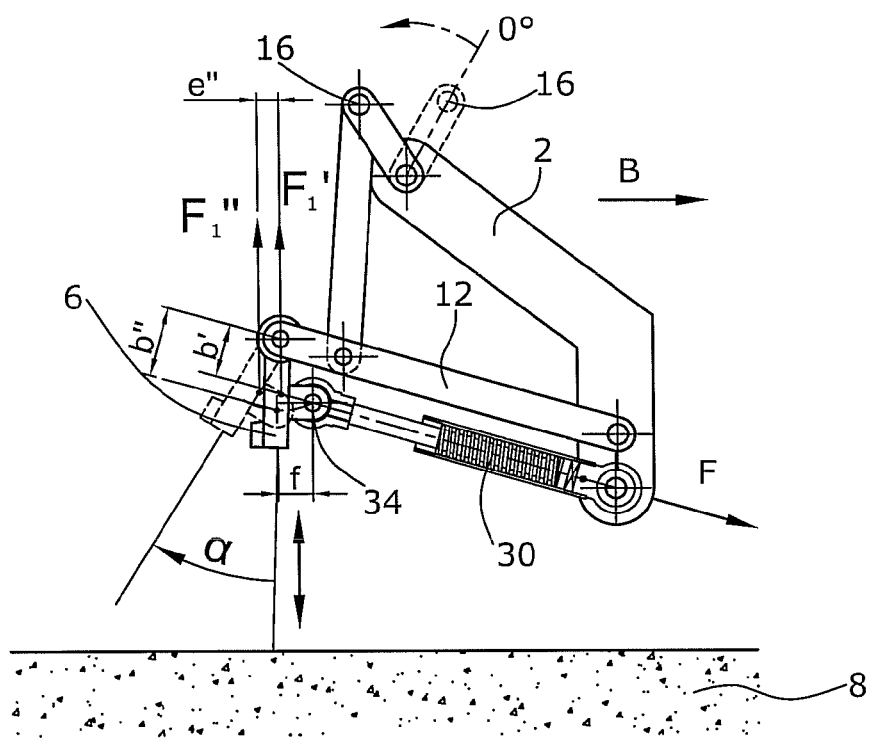
Fig.5
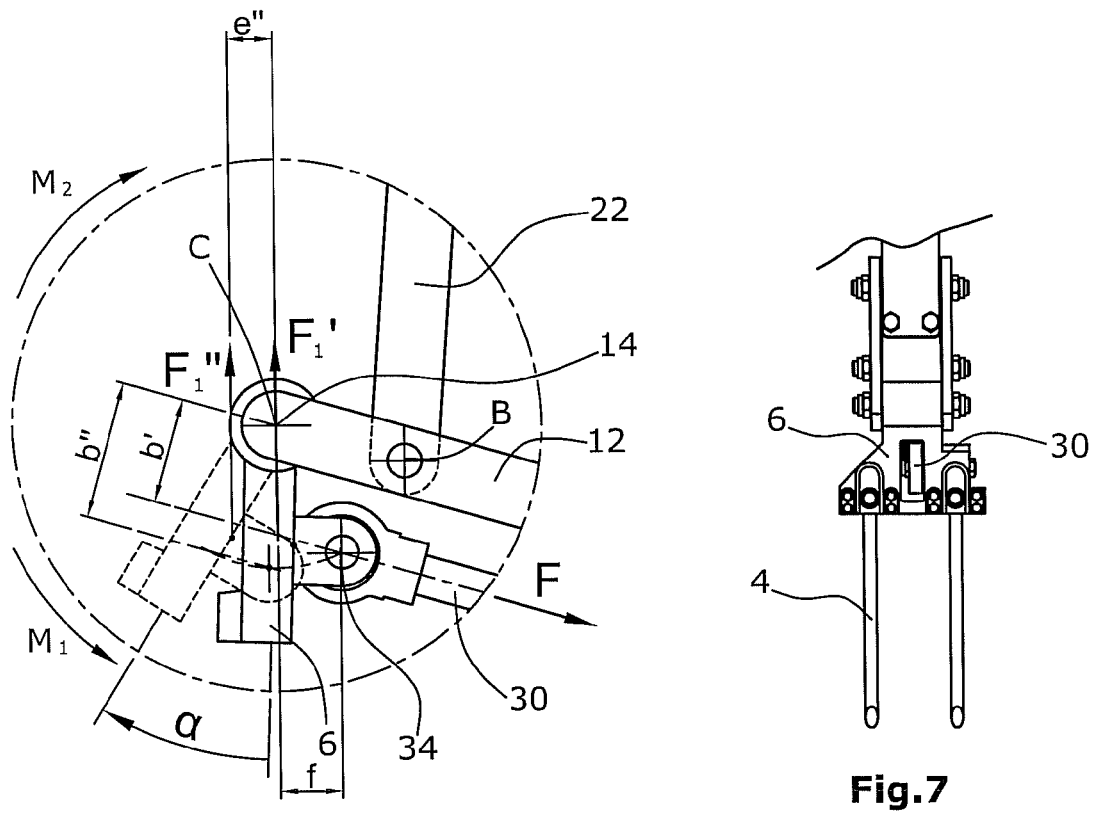
Fig.6
Fig.7

SOIL AERATION DEVICE

RELATED APPLICATIONS

This application is the U.S. national stage application which claims priority under 35 U.S.C. §371 to International Patent Application No.: PCT/EP2009/053520, filed on Mar. 25, 2009, which claims priority under 35 U.S.C. §119, to European patent application No.: 08153919.9, filed on Apr. 1, 2008, the disclosures of which are incorporated by reference herein their entireties.

The invention refers to a mobile soil aeration device according to the preamble of claim 1.

Such devices serve to make cavities in a soil by means of piercing tools, wherein slit-shaped cavities are formed in the deeper regions of the soil, while holes as small as possible shall remain at the soil surface even at higher traveling speeds. The cavities allow for a better drainage of water and improve the soil aeration, while the loosening of the soil enhances the growth of plants, in particular of grasses.

The soil aeration devices used for these purposes up to the present and known from the European Laid-Open Document EP-A-0037595 use two support arms guided in the manner of a parallelogram, one end of which holds a tool holder for pivotable movement, while the other end is pivotably supported at the machine frame. The pushrod of the crank drive is articulated at the tool holder and drives the same so that it moves up and down. One of the two support arms is variable in length and comprises a stop spring means. As long as the piercing tool is outside the soil, the support arm rests against the stop due to the spring force. When the piercing tool is inserted and the soil aeration device moves forward, the piercing tool pivots together with the tool holder in a direction opposite to the traveling direction and the length-variable support arm is extended against the action of the spring force.

The previously known soil aeration devices use spring elements that exert a restoring moment on the piercing elements so that the piercing elements return to their start positions as soon as they are outside the soil. Hereinafter, the start position is referred to as the position the at least one piercing tool is in just before piercing. Outside the soil, however, the restoring moment of the spring is counteracted by the moment of inertia of the tool holder and the piercing tool, due to the mass inertia and the up-and-down movement. For this reason, spring elements with great spring rigidity are used to move the piercing tools back into their start position. Due to the great spring rigidity of the spring elements there is an increased risk that the piercing tools, while still in the soil, will make slots in the soil surface instead of the desired small holes. Preferably, the piercing tool is pulled against a stop by the spring element, which stop defines the start position. Moreover, if the spring rigidity of the spring element is great, the piercing tool hits hard against the stop, whereby the bearings could be damaged.

Therefore, it is an object of the invention to provide a device of the above described kind wherein the risk of forming slots is reduced.

The object is achieved with the features of claim 1.

The invention advantageously provides that in a soil aeration device of the above described kind a restoring element engages a tool holder at a distance from a plane extending through a first pivot axis and in parallel to the tool holder and the piercing tool and offset in the direction of the restoring force of the restoring element acting on the tool holder, whereby the lever arm of the restoring force active about the first pivot axis is enlarged at least at a maximum deflection of the tool holder relative to the start position.

Given the same force, a larger lever arm results in a higher moment. Therefore, the restoring moment acting on the tool holder at the maximum deflection of the tool holder is higher than the restoring moment acting on the tool holder in the start position. For this reason, the spring rigidity can be reduced, whereby the risk of forming slots is lowered and the mechanical stress on the machine components is reduced since the impacts against a stop, for instance, are reduced.

Preferably, the amount of offset with which the restoring element engages is such that, at the maximum deflection of the tool holder, the force application point of the restoring element is situated in a substantially vertical plane extending through the first pivot axis.

The restoring element preferably extends substantially vertically to the guide arm.

The restoring element is articulated at the tool holder. The restoring element may be a tension spring.

The restoring element may be integrated in a second guide arm coupled in an articulated manner with the machine frame and the tool holder.

The second guide arm may exert a tensile force on the tool holder, wherein the tensile force is generated by a compression spring.

The force application point of the restoring element is preferably arranged centrally with respect to the width of the tool holder. This is advantageous in that no torsional forces act on the tool holder and that the bearings of the guide arms are not stressed asymmetrically.

The force application point of the restoring element may be located at a projection protruding from the tool holder, below the first pivot axis and offset in the direction of the restoring force acting on the tool holder. This has the additional advantage that the overall center of gravity of the tool holder and the piercing tool is thereby shifted such that at maximum deflection a lesser moment of inertia acts on the tool holder and the piercing tool. Due to the moment of inertia, the tool holder and the piercing tool have a tendency to pivot upward.

The tool holder preferably carries a plurality of tools.

Embodiments of the invention will be detailed hereunder with reference to the drawings.

Figure 2:
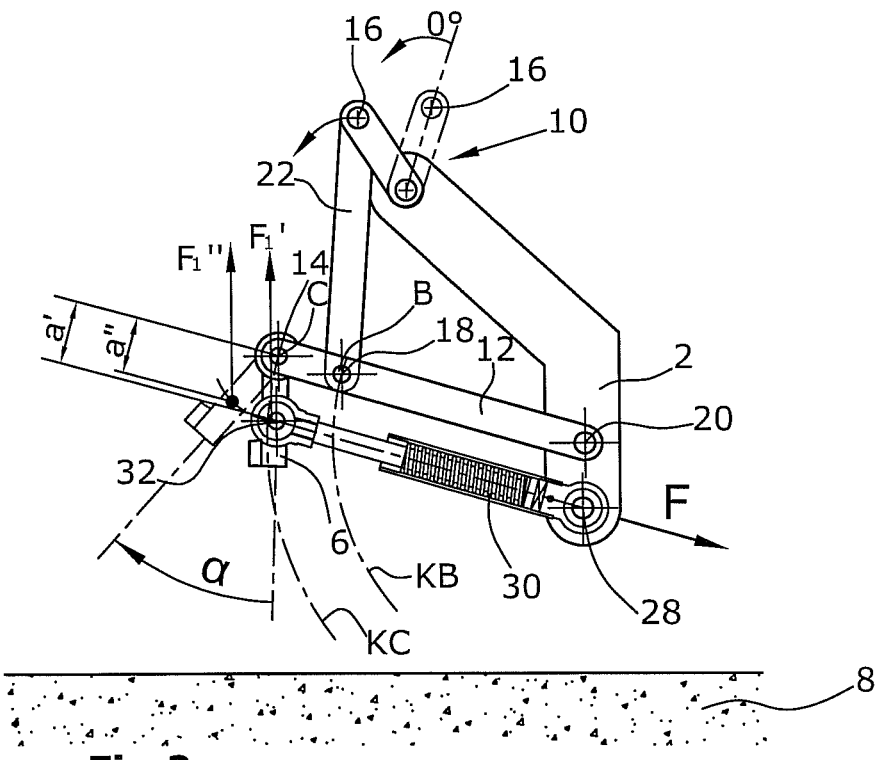
Figure 3:
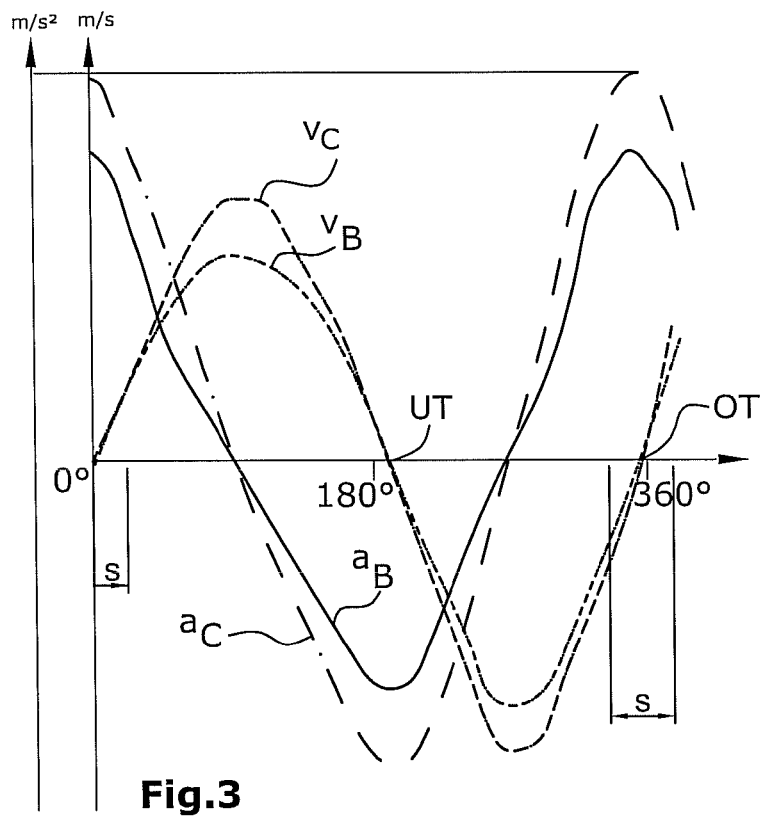
Figure 4:
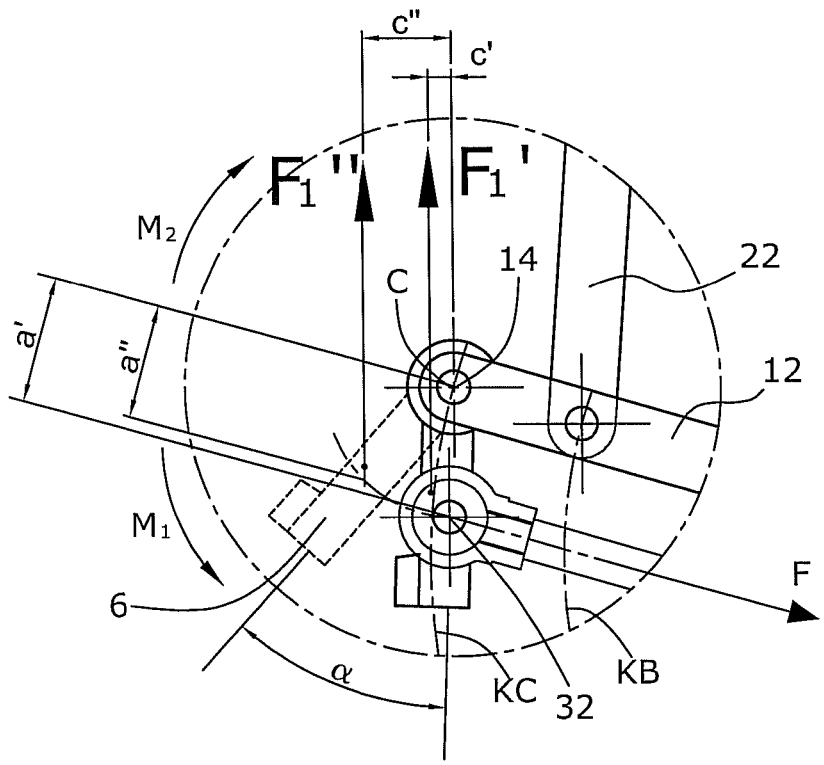
Figure 8:
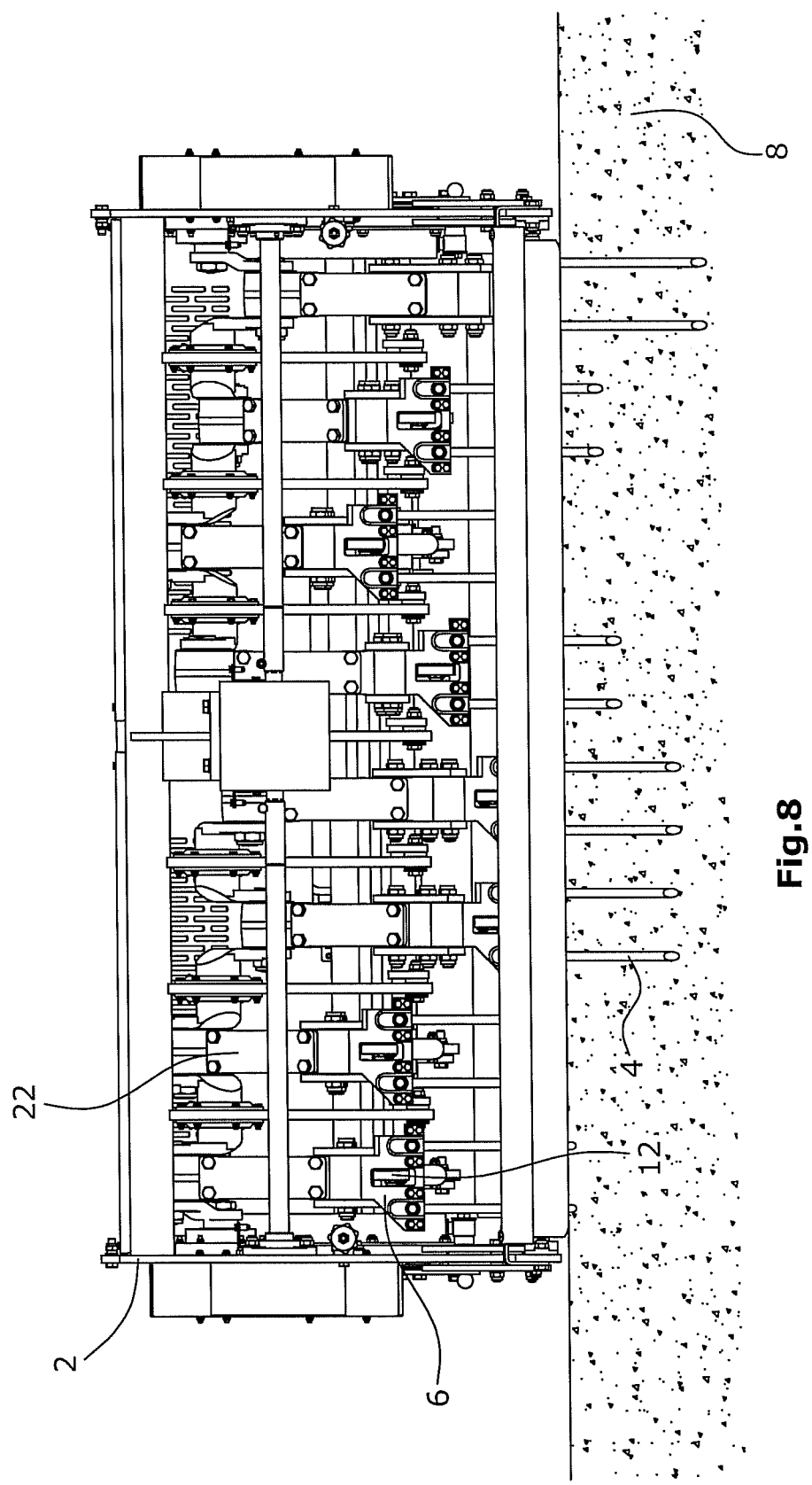

The Figures schematically show:

FIG. 1 a side elevational view of a soil working machine,

FIG. 2 a side elevational view of an embodiment as known from prior art,

FIG. 3 speed and acceleration curves at a constant angular velocity of the crank drive, FIG. 4 a detail of the embodiment illustrated in FIG. 2, FIG. 5 an embodiment of the present invention, FIG. 6 a detail of the embodiment illustrated in FIG. 5, FIG. 7 a front view of the embodiment illustrated in FIG. 6, FIG. 8 a rear view of an embodiment of the present invention.

FIG. 1 is a side elevational view of a mobile soil aeration device 1 which is either self-propelled or may be pulled by a tractor. This soil aeration device 1 comprises a machine frame 2 at which a plurality of piercing tools 4 are supported in a pivotable and guided manner by guide arms 12, the piercing tools being adapted to be moved up and down by a drive 10. Due to the up-and-down movement, the piercing tools 4 are alternately pushed into the soil 8 and make a tilting movement in the soil 8 because of the forward movement of the soil aeration device 1. Thereby, the soil 8 beneath the pierced hole is broken, whereby the aeration and/or drainage of the soil 8 are enhanced, for instance. The pierced hole in the soil surface should remain as small as possible even at a higher traveling speed of the soil aeration device 1. The at least one piercing tool 4 is fastened to a tool holder 6 either as a single tool or as a group. The tool holder 6 is guided by a guide arm 12. The guide arm 12 is preferably driven by a crank drive 10 and makes an up-and-down movement. As an alternative, the guide arm 12 may also be driven hydraulically or electrically.

The tool holder 6 is supported at the guide arm 12 for pivotal movement about a first pivot axis 14, the tool holder 6 receiving one piercing tool 4 or a set of piercing tools 4 that can be pushed into the soil 8 and be pulled out therefrom due to the up-and-down movement. A plurality of piercing tools 4, preferably arranged side by side, or a plurality of juxtaposed sets of piercing tools 4 can be driven. The piercing tools 4 or sets of piercing tools 4 are preferably driven in a phase-delayed manner.

FIG. 2 is a side elevational view of an embodiment known from prior art. A crank drive 10 drives the guide arm 12 via a pushrod 22. The pushrod 22 is supported at a first pivot bearing 18 on the guide arm 12 which extends in parallel to the traveling direction. The guide arm 12 is pivotably supported at a second pivot bearing 20 on the machine frame 2. A tool holder 6 is supported at the guide arm 12 for pivotal movement about a first pivot axis 14. At least one piercing tool 4 is fixedly mounted to the tool holder 6. The axes of the pivot bearings 18, 20 and the first pivot axis 14 extend in parallel to the ground surface of the soil 8 and orthogonally to the travelling direction.

A restoring element 30 is mounted substantially in parallel to the guide arm 12 and below the same. One side of the restoring element 30 is pivotably supported at the machine frame 2 and the opposite side is pivotably supported at the tool holder 6. The restoring element 30 allows the pivoting of the tool holder 6 about the first pivot axis 14 and, when the engagement with the soil has ceased, exerts a restoring force F on the tool holder 6 at the force application point 32 where the restoring element 30 is supported at the tool holder 6, so that the piercing tool 4, after having been pulled from the soil 8, pivots back to the start position. The restoring force F acts in the direction of the longitudinal axis of the restoring element 30.

Driven by the pushrod 22 of the crank drive 10, the guide arm 12 performs an up-and-down movement, especially at the points B and C. The guide arm 12 pivots about the second pivot bearing 20 so that at the points B and C the guide arm 12 pivots along a circular path KB and KC, respectively. The velocities $v_B$ and $v_C$ at which the points B and C of the guide arm 12 move up and down always act in a direction tangential to the circular paths KB and KC. In FIG. 3, the velocities $v_B$ and $v_C$ are illustrated in a simplified manner for a constant angular velocity of the crank drive 10. In FIG. 3 the angular position of the crank pin 16 is plotted on the x axis. The points B and C of the guide arms 12 reach the bottom dead center UT after the crank pin 16 has already passed 180°. This is the case because, on the one hand, the rotary axis of the crank drive 10 and the first pivot bearing 18 are positioned with a mutual horizontal offset and, on the other hand, the points B and C of the guide arm 12 do not perform an exactly vertical movement due to the pivot movement of the guide arm 12 about the second pivot bearing 20.

FIG. 3 also illustrates the acceleration curves $a_B$, $a_C$ of the points B and C of the guide arm 12. At the top dead center OT and the bottom dead center UT of the up-and-down movement, where the velocities $v_B$ and $v_C$ are zero, the accelerations $a_B$, $a_c$ reach their maximum values. The maximum values of the accelerations $a_B$, $a_c$ are multiples of the gravitational acceleration. In the ranges marked with an S, the piercing tools 4 are outside the soil. In this range a very great positive acceleration acts on the masses moved along in the up-and-down movement. The accelerations $a_B$, $a_C$ always act in a direction tangential to the circular paths KB, KC about the second pivot bearing 20. Since the points B and C of the guide arm 12 make an almost vertical movement, the portions of the accelerations $a_B$, $a_C$ acting in the vertical direction are multiples of the horizontal components of the accelerations $a_B$, $a_C$. This means that, in the range outside the soil, a very great upward and vertically directed acceleration acts on the masses moved along in the up-and-down movement, i.e. it also acts on the tool holder 6 and the at least one piercing tool 4. The force acting on the tool holder 6 and the piercing tool 4 due to this vertical acceleration is indicated in FIGS. 2 and 4 by $F_1'$ and $F_1''$, respectively.

The force $F_1'$, $F_1''$ acts in the overall center of gravity of the tool holder 6 and of the piercing tool 4 on the tool holder 6 and the piercing tool 4. Together with the active lever arm c', c'', the force $F_1'$, $F_1''$ causes a moment M2 about the first pivot axis 14. Due to the moment M2, the tool holder 6 and the piercing tool 4 tend to pivot upward as long as the piercing tool 4 is outside the soil. Since the force $F_1'$, $F_1''$ depends on the vertical components of the acceleration acting on the tool holder and the piercing tool, and thus depends on the square of the velocity, the $F_1'$, $F_1''$ can easily become very great if the piercing tools are pushed into and pulled out from the soil very quickly.

The moment M2 is counteracted by the spring force F of the restoring element 30 that is to pivot the tool holder 6 and the piercing tool 4 back to the start position. Together with the active lever arm a', a'', the force F generate a moment M1. For the piercing tool to be pivoted back to the start position, the moment M1 must be greater than the moment M2 outside the soil. However, as a consequence, the force F of the restoring moment must be great. If, however, the force F of the restoring moment is too great, it will cause the piercing tool 4 to make slots in the soil 8 at high traveling speeds while the piercing tool 4 is in the soil. Therefore, the necessary force F of the restoring moment should on the one hand be as small as possible and on the other hand be great enough to be able to carry out the restoring movement fast enough.

The embodiment in FIG. 2 which illustrates a soil aeration device 1 already known from prior art, is illustrated in FIG. 4 as an upscaled part thereof. With conventionally known soil aeration devices 1, the restoring element 30 engages the tool holder 6 laterally with respect to the width. Thus, the force F attacks at the force application point 32. On the one hand, the tool holder 6 is illustrated in the start position and, on the other hand, it is illustrated in dotted lines at maximum deflection with the piercing tool 4 already being outside the soil 8 again in this position. The active lever arm of the moment M1 in the start position is referenced as a'. The active lever arm of the moment M1 at maximum deflection is referenced as a''. It is evident that, with respect to the start position, the active lever arm at maximum deflection is reduced from a' to a''. However, this is disadvantageous since the restoring moment M1 at maximum deflection of the tool holder 6 should be greater than in the start position.

In the embodiment of the present invention represented in FIGS. 5 to 7, the force F of the restoring element 30 attacks at the force application point 34. The force application point 34 is located at the tool holder 6 at a distance f from the plane extending through the first pivot axis 14 and in parallel to the tool holder 6 and the piercing tool 4 and offset in the direction of the restoring force F of the restoring element 30 acting on the tool holder 6. The active lever arm of the moment M1 in the start position is referenced as b'. The active lever arm of the moment M1 at maximum deflection of the tool holder 6 is referenced as b''. It is obvious that the active lever arm b'' at maximum deflection of the tool holder 6 is clearly greater than the active lever arm b' in the start position. A greater active lever arm results in a higher moment.

The restoring force F of the restoring element 30 attacks at the force application point 34 on a projection of the tool holder 6. This embodiment has the additional advantage that the overall center of gravity of the tool holder 6 and the piercing tool 4 is slightly offset in the rearward direction with respect to the plane extending through the first pivot axis 14 and in parallel to the tool holder 6 and the piercing tool 4. Thereby, the active lever arm e" at maximum deflection is reduced with respect to the lever arm c" at maximum deflection shown for the embodiment in FIG. 2. Thereby, the moment of inertia M2 is reduced as well, which moment causes the tendency of the tool holder 6 with the piercing tool 4 to pivot upward at maximum deflection of the tool holder 6, when the piercing tool 4 is outside the soil.

This embodiment has the additional advantage that the force application point 34 of the restoring force F is articulated centrally at the tool holder with respect to the width of the tool holder. This is illustrated in FIGS. 7 and 8, where FIG. 8 shows a rear view of an embodiment of the invention. By articulating the force application point 34 of the force F at the tool holder at a central position with respect to the width of the tool holder, the tool holder 6 cannot be canted with respect to the guide arm 12 when pivoting back to the start position, since the restoring force attacks at a central position with respect to the width of the tool holder 6. This reduces the wear of the machine components, in particular the bearings, since the same are stressed symmetrically.

The invention claimed is:

1. A mobile soil aeration device comprising:
   a machine frame,
   a drive,
   at least one guide arm moved up and down by said drive and arranged in a pivotable manner at said machine frame, the guide arm comprising at least one piercing tool coupled with the guide arm in an articulated manner, said piercing tool being adapted to be pushed into the soil and to be pulled out from the soil,
   a tool holder for the piercing tool, which is supported for movement about a first pivot axis in the guide arm adapted to be moved up and down by the drive, so as to allow for a pivoting of the piercing tool with respect to the guide arm during engagement in the soil,
   wherein, prior to piercing, the piercing tool is in a start position under a predetermined piercing angle, and
   wherein a restoring element is integrated in a second guide arm coupled in an articulated manner with the machine frame and the tool holder,
   wherein the second guide arm is variable in length, such that the restoring element allows the pivoting of the tool holder about the first pivot axis,
   wherein, after the piercing tool has been pulled from the soil, the restoring element engaging the tool holder pivots the piercing tool back to the start position,
   wherein the restoring element engages the tool holder at a distance from a plane extending through the first pivot axis and in parallel to the tool holder and the piercing tool and offset in the direction of a restoring force of the restoring element acting on the tool holder, whereby a lever arm of the restoring force active about the first pivot axis is enlarged at least at a maximum deflection of the tool holder relative to the start position, wherein the restoring moment acting on the tool holder after have been pulled from the soil, when the tool holder has the maximum deflection, is higher than the restoring moment acting on the tool holder prior to piercing, when the tool holder is in the start position.

2. The soil aeration device of claim 1, wherein the restoring element engages at an offset by such an amount that a force application point of the restoring element at maximum deflection of the tool holder is situated in a substantially vertical plane extending through the first pivot axis.

3. The soil aeration device claim 1, the restoring element extends substantially in parallel to the guide arm.

4. The soil aeration device of claim 1, wherein the restoring element is articulated to the tool holder.

5. The soil aeration device of claim 1, wherein the restoring element is a tension spring.

6. The soil aeration device of claim 1, wherein the second guide arm exerts a tensile force on the tool holder, the tensile force being generated by a compression spring.

7. The soil aeration device of claim 1, wherein a force application point of the restoring element is situated centrally with respect to the width of the tool holder.

8. The soil aeration device of claim 1, wherein a force application point of the restoring element is situated on a projection protruding from the tool holder, below the first pivot axis and offset in the direction of the restoring force acting on the tool holder.

9. The soil aeration device of claim 1, wherein the tool holder carries a plurality of tools.

\* \* \* \* \*